United States Patent
Nuebling

(10) Patent No.: US 7,644,864 B2
(45) Date of Patent: Jan. 12, 2010

(54) APPARATUS FOR READING CODES

(75) Inventor: Ralf Ulrich Nuebling, Denzlingen (DE)

(73) Assignee: Sick AG, Waldkirch (DE)

( * ) Notice: Subject to any disclaimer, the term of this patent is extended or adjusted under 35 U.S.C. 154(b) by 591 days.

(21) Appl. No.: 11/363,595

(22) Filed: Feb. 27, 2006

(65) Prior Publication Data

US 2006/0203364 A1 Sep. 14, 2006

(30) Foreign Application Priority Data

Mar. 1, 2005 (DE) .................. 10 2005 009 309

(51) Int. Cl.
*G02B 26/08* (2006.01)

(52) U.S. Cl. ............. 235/462.22; 235/454; 235/462.01; 235/462.14; 235/462.23; 235/462.32; 235/462.4; 235/462.41

(58) Field of Classification Search ............ 235/462.01, 235/462.14, 462.22, 462.23, 462.32, 462.4, 235/454, 462.41, 462.2, 462.36, 462.08, 235/462.09

See application file for complete search history.

(56) References Cited

U.S. PATENT DOCUMENTS

| | | | | |
|---|---|---|---|---|
| 4,589,738 A | * | 5/1986 | Ozaki | ................... 359/729 |
| 5,170,277 A | * | 12/1992 | Bard et al. | ................... 359/210 |
| 5,401,948 A | * | 3/1995 | Krichever et al. | ...... 235/462.35 |
| 5,811,828 A | * | 9/1998 | Laser | ................... 250/566 |
| 5,872,354 A | | 2/1999 | Hanson | |
| 6,084,706 A | * | 7/2000 | Tamkin et al. | ............. 359/366 |
| 6,801,260 B1 | | 10/2004 | Veksland et al. | |
| 6,988,663 B2 | * | 1/2006 | Krichever et al. | ...... 235/462.23 |
| 7,147,158 B2 | * | 12/2006 | Harris et al. | ............... 235/454 |
| 2003/0201329 A1 | * | 10/2003 | Kumagai et al. | ....... 235/462.32 |
| 2004/0035931 A1 | * | 2/2004 | Matsuura et al. | ........... 235/454 |

FOREIGN PATENT DOCUMENTS

WO    WO 93/14470    7/1993

\* cited by examiner

*Primary Examiner*—Thien M. Le
*Assistant Examiner*—Tuyen K Vo
(74) *Attorney, Agent, or Firm*—Townsend and Townsend and Crew, LLP

(57) ABSTRACT

A code reader for reading one- and/or two-dimensional codes. A position resolving light receiver (3) is mounted in a housing (2). An imaging optics made of several components is associated with the light receiver and is also disposed in the housing. The imaging optics has at least one stationary optics (4) and a deflecting optics arranged on an optical axis (10) in front of the light receiver (3). A pivot arm is mounted on a pivot axis (9) in the housing. Pivoting of the pivot arm results in a positional and angular change of the effective back optical focal distance measured from the vortex of the last back surface of the lens to the focal point thereof. If the objects to be identified are at different distances from the identification apparatus, the pivot arm (8) is pivoted. As a result, the deflection optics mounted on the pivot arm changes the effective back focal distance as well as the focal length of the imaging optics to thereby project an exact image onto the light receiver.

20 Claims, 5 Drawing Sheets

APPARATUS FOR READING CODES

RELATED APPLICATIONS

This application claims priority under 25 USC Section 119 from German application No. 10 2005 009 309.4 filed Mar. 1, 2005.

BACKGROUND OF THE INVENTION

The present invention concerns an identification system, and in particular a code reader, for reading one- and/or two-dimensional codes that are arranged at different distances. The code reader employs a position resolving light receiver mounted in a housing in which associated imaging optics is arranged.

Known identification systems project an image of a code onto an image plane via an imaging optics. A position resolving light receiver is located in the image plane and has multiple, light-receiving pixels arranged linearly or in matrix form.

The differing light contrasts of the code are reproduced by the projected image and cause varying photocurrents in the individual light-receiving pixels of the light receiver which can be used to generate signals which identify the content of the code.

Such coding systems have many applications. For example, they can be used to identify and/or control individual objects in transportation systems. The present invention is not limited to processing particular codes and applies to all types of information carriers which can be photoprocessed.

Efficient coding systems are expected to contain increasing amounts of information on coding surfaces that are as small as possible. This requires that the identification system have a high spatial resolution. Particularly high demands are placed on the coding system when the positional location of the code can vary over a relatively large distance range. Efficient coding systems must further exhibit a high degree of readability, which requires, amongst others, efficient projection optics. These two requirements, that is, the ability to generate high quality images of objects that can be spaced apart over a wide range, and at the same time provide efficient projection optics, demand that the coding system be equipped with an automatic focusing system.

Known identification systems with automatic focusing systems distinguish between:
1) pure distance adjustments for different object spacings by adjusting the so-called "back focal distance", which is measured from the vertex of the last back surface of a lens to its focal point, and
2) a change in the focal length of the imaging optics (a zoom characteristic) for changing the image scale for different object spacings.

For adjusting the distance, the entire imaging optics can be moved along the optical axis, for example, while the position resolving light receiver remains stationary. For such applications, it is typical to employ a servo motor which engages an appropriate mechanism at the imaging optics so that activation of the servo motor converts the rotary motions of the latter into linear movements of the optics. Light-efficient receiving objects with long focal lengths have a relatively large mass so that focusing motions require substantial amounts of energy. Further, the bearings of such systems are subjected to mechanical wear and tear, which can lead to a deterioration of the components requiring repair and/or replacement. Such an approach to focusing is further relatively slow and typically requires relatively much more time so that such systems cannot adequately react when the object distances change rapidly.

In another known system, the distance adjustment is accomplished by stationarily mounting the imaging optics and moving the position resolving light receiver, including, when applicable, the entire circuit board on which the optics might be mounted with all its electronic components. In such an arrangement, the light receiver as well as other electric components mounted on the board are subjected to significant mechanical stresses. In addition, such arrangements require multi-path electrical connections which are subject to continuous motions and resulting wear and tear. Such installations, when used over the life cycle of an identification system, may be subject to between $10^7$ to $10^9$ operating cycles or more. Interruptions of the electrical connection to and from the light receiver and the other components on the board and/or their mechanical wear and tear are of course highly undesirable.

WO 93/14470 discloses a mobile optical code reader in which the back focal distance, that is, the effective distance between the imaging optics and the position resolving light receiver, is adjustable for focusing. WO 93/14470 accomplishes this by giving the light beam between the imaging optics and the position resolving light receiver a z-shaped path. An arrangement for folding the light beam in this manner is a planar reflecting mirror connected to a pivotable drive quadrant. An advantage of such a position adjustment system is that both the imaging optics and the position resolving light receiver can be stationarily fixed in a housing. However, these advantages are offset by the very complicated and costly nature of pivotally jointed drive quadrants. The reason for this is that in such systems the connector which mounts the deflecting mirror must have both ends rotatably connected to rods of the quadrant. In addition, it is necessary that the two rods be rotatably connected to the instrument or housing base. Thus, the connector and the two rods require four separate rotary joints. Especially for instances when the imaging optics has a relatively short focal length, precise focusing requires movements over very small distances in the range of a few μm which must be precise and precisely reproducible. To make this possible, the rotary joints must be tight and free of play and tolerances over a large number of operating cycles. This significantly enhances costs and requires more space.

U.S. Pat. No. 6,801,260 discloses an arrangement in which a movable mirror is arranged between fixed projecting optics and a fixed light receiver. The mirror is moved either linearly or pivotally to change the distance to the projecting optics. This changes the back focal length so that the images on the position resolving light receiver of objects with different object distances are always sharp and clear.

Such a distance adaptation for different object spacings has the disadvantage that for more distant objects relatively smaller image sizes are reproduced on the picture sensor. As a result, in such situations greater object distances reduce the ability for an error-free recognition of smaller objects.

To avoid this, such identification systems, in addition to adjusting the distance setting, require that the image reproduction scale, that is, the focal length of the imaging optics, be adjusted to reflect the actual distance of the object.

SUMMARY OF THE INVENTION

It is an object of the present invention to provide an automatic focusing system which, for the optical identification of objects, can be adjusted to reflect the distance of the object and at the same time provide an at least partial adjustment of the projected image size which is inexpensive to produce, which can react quickly to changes in the object distance, and which is not subject to wear and tear.

This is attained by providing an imaging optics which has a plurality of components including at least one stationary optics and at least one deflecting or deflection optics arranged on an optical axis in front of a position resolving receiver. A pivot arm is pivotable about a pivot axis arranged in the housing, and the deflecting optics is mounted on the pivot arm so that pivotal movements of the deflecting optics with the pivot arm cause a positional and angular change in the effective back focal distance of the optics. The deflecting optics is mounted on the pivot arm and influences the pivotal length of the imaging systems and, in addition to changes in the effective back optical distance, pivotal movements of the pivot arm change the focal length of the imaging optics.

More particularly, the present invention solves the heretofore encountered focusing problems by mounting a position resolving light receiver in a housing of the identification system. An imaging optics is also arranged in the housing and is made up of a plurality of spatially separate components. The imaging optics has at least one stationary optics and a deflecting optics arranged on an optical axis in front of the light receiver. The imaging optics is mounted on a pivot arm that is pivotal about a pivot axis of the housing. Thus, by pivoting the pivot arm, the effective back focal distance is spatially and angularly changed. In accordance with the invention, an optical component is provided which influences the focal length of the imaging optics so that, upon pivoting the pivot arm, the focal length of the imaging optics is changed, in addition to a change in the effective optical back focal length. When the objects to be identified are at different distances from the identification system, the pivot arm is pivoted to not only reproduce an exact image on the light receiver, but to also change the focal length of the imaging optics to thereby change the scale of the reproduction and give the image on the light receiver the desired size.

In one advantageous embodiment of the invention, the deflection optic includes an inclined hollow or concave mirror or an outwardly curved, convex mirror. This permits one to change the direction of the optical axis and facilitate changing the focal length of the imaging optics with only one optical element, which is advantageous with regard to both the size of the unit and its production costs.

In a further development of the invention, the convex or concave mirror has a spherical, aspherical, toroidal or cylindrical surface configuration. In this manner, imaging errors of the imaging optics that might arise, such as, for example, aperture errors or astigmatism, can be corrected.

Another aspect of the present invention provides that the surface configuration of the concave or convex mirror is off-axis. This is particularly advantageous when the angular inclination of the concave or convex mirror is large or can change significantly over the range of possible adjustments and provides further latitude for correcting image errors when non-spherical mirrors are positioned off-axis.

Depending on the desired or needed quality of the imaging optics, the present invention provides that the deflection optics be a combination of one mirror and one or more lenses or lens groups. This permits the distribution of the functions of changing the direction of the optical axis and varying the focal length of the imaging optics over a plurality of optical components, and makes it possible to increase the zooming range of the imaging optics while at the same time improving the correction of imaging errors.

One aspect of the invention combines one mirror with one or more lenses or lens groups with convex as well as concave lenses having spherical, aspherical, toroidal or cylindrical surface configurations.

To suppress stray light from interfering with such identification systems, it is conventional to provide an additional spectral filter which limits the light or optical radiation received by the light receiver. The present invention combines this optical filter effect with a component of the deflection optics. This can be attained, for example, by providing the reflection mirror, or a bordering surface of the lenses, with selected spectral layers. In this manner, the need for a separate optical filter is eliminated, which advantageously reduces costs as well as assembly and installation efforts.

In an advantageous development of the present invention, the image remains focused in the center of the light receiver when the deflection optics is moved by the pivot arm. Maintaining the image center on the position resolving light receiver has the advantage that the direction of view does not change. In this manner, the identification system can provide identification for not only the content of the object, but also about the actual position of the identified object.

It is particularly advantageous that the rapid and wear-free focusing in accordance with the present invention involves only one mechanical adjustment which causes movement of the deflection optic and adjusts the back focal distance as well as the focal length of the imaging optics. This means additionally that the space and costs of the focusing system are reduced.

A further advantage of the present invention is that the mechanical coupling between the pivot arm and the housing of the identification system has only one pivot joint. This pivot joint operates over only a limited rotational angle which makes it possible to construct the pivot joint of a flat, flexible spring band. This provides a well-defined, play-free pivot bearing which can operate over long periods of time in a stable, wear-free manner.

The present invention is further described with reference to FIGS. 1 through 4, each of which is a schematic side view of an embodiment of the identification system of the present invention which has a focusing system that includes a deflection optics mounted on a pivot arm.

DESCRIPTION OF THE PREFERRED EMBODIMENTS

Figure 1:
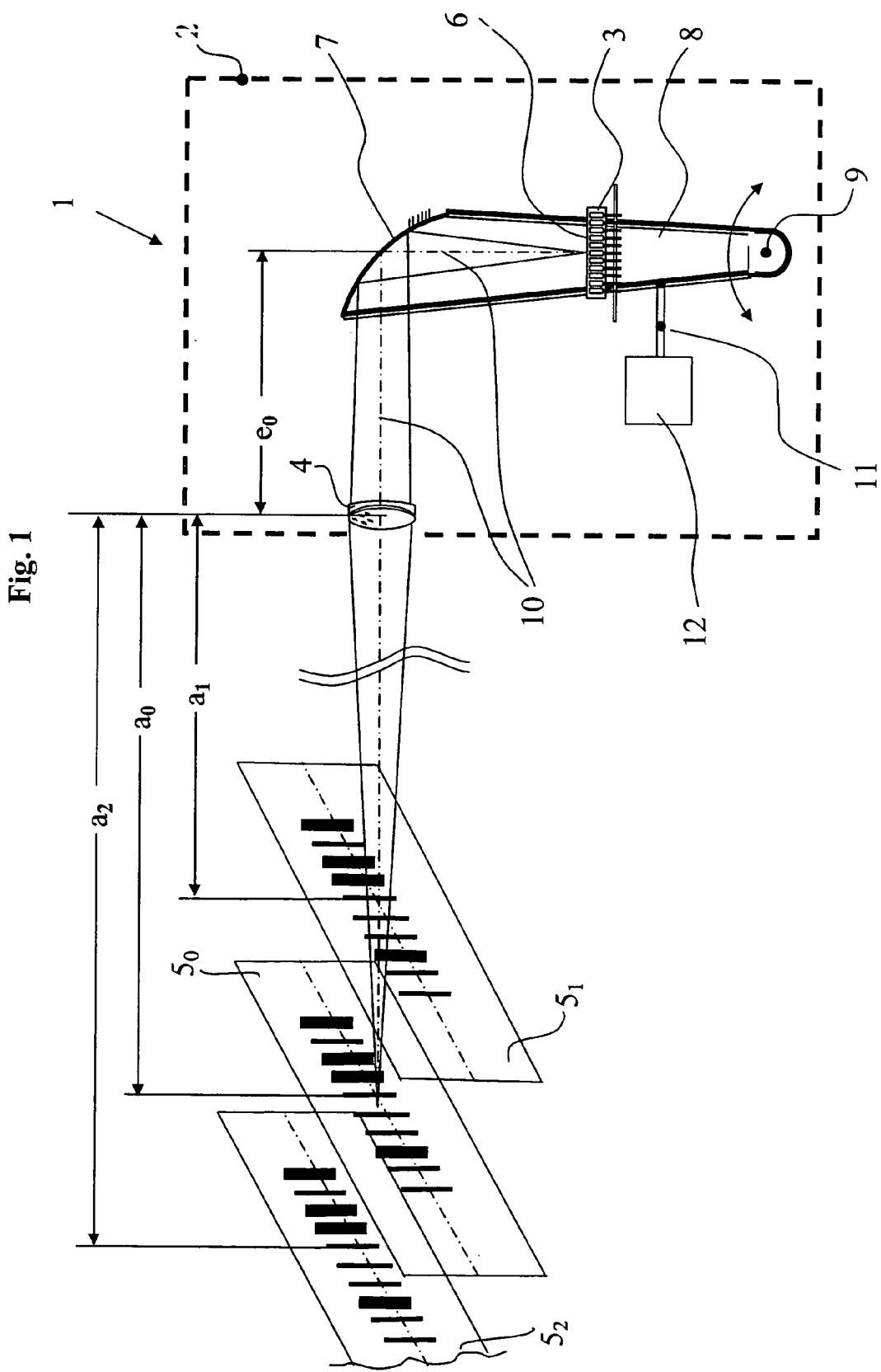
FIG. 1 shows the deflection optics of the present invention employing an inclined concave mirror.

FIG. 1 illustrates the identification system of the present invention in the form of a code reader 1. Code reader 1 includes a housing 2 and a position resolving light receiver 3. For reading one-dimensional codes, the light receiver can be a CCD-line or a CMOS-line. For reading two-dimensional codes, the position resolving light receiver can be a CCD-surface or a CMOS-surface.

Also mounted in housing 2 is an imaging optics constructed of a plurality of spatially separated components which project an image of an object $5_0$ onto a surface 6 of the position resolving light receiver 3.

Where needed, an illumination system (not shown in FIG. 1) can be provided for lighting up object $5_0$. Such an illumination system, which may have one or more light sources, can form an integral part of code reader 1, or it can be an independent, external lighting unit.

The projection optics has at least one stationary optics 4 and a deflection optics which lies on an optical axis 10 ahead of light receiver 3. The deflection optics is mounted on a pivot arm 8 that is pivotally attached to the housing at a pivot axis 9. The deflection optics illustrated in FIG. 1 is formed by an inclined concave mirror 7 which is arranged at an angle of about 45° to the incoming light beam. In this way, the concave mirror deflects the incoming light at an angle of about 90° towards light receiver 3. At the same time, concave mirror 7 together with stationary optics 4 projects an image of object $5_0$, located at a distance $a_0$ from the stationary optics 4, onto light receiver 3. The focal distance of the projecting optics is defined by the focal distance of stationary optics 4, the focal distance of concave mirror 7, and the distance $e_0$ between the two optical components. If the object spacing $a_0$ changes to $a_1$ or $a_2$, pivot arm 8 must be pivoted about pivot axis 9 to project a precise image of objects $5_1$ and $5_2$, respectively, onto a surface 6 of the position resolving light receiver 3. Since, as already mentioned, the focal distance of the projection optics is a fraction of the spacing e between the two optic components, pivot movements of pivotal arm 8 also cause a change in the focal distance and therewith in the size of the projected image. With this change in focal distances, the image of differently spaced objects has approximately the same size on surface 6 of the position resolving light receiver 3. The concave mirror 7 shown in FIG. 1 can be replaced by a convex mirror. Both the concave mirror and the convex mirror can have a spherical, aspherical, toroidal or cylindrical form. It can also be configured as a diffractive element. For certain applications, it can be advantageous to arrange the concave or convex mirror off-axis.

When the deflecting optics uses a concave mirror, its focal distance becomes less when the distance e becomes less. Conversely, when the deflection optics uses a convex mirror, the focal length increases when the distance e becomes less. A linear actuator 12 is also mounted in the housing and causes pivotal movements of pivot arm 8 via a movable push rod 11, thereby also pivoting the deflecting optics about pivot axis 9. In FIG. 1, the schematically illustrated actuator 12 can alternatively be a rotary actuator, such as a stepping motor for moving the pivot arm. For moving the pivot arm, magnetic actuators, pneumatic/hydraulic actuators and the like can also be employed.

Figure 2:
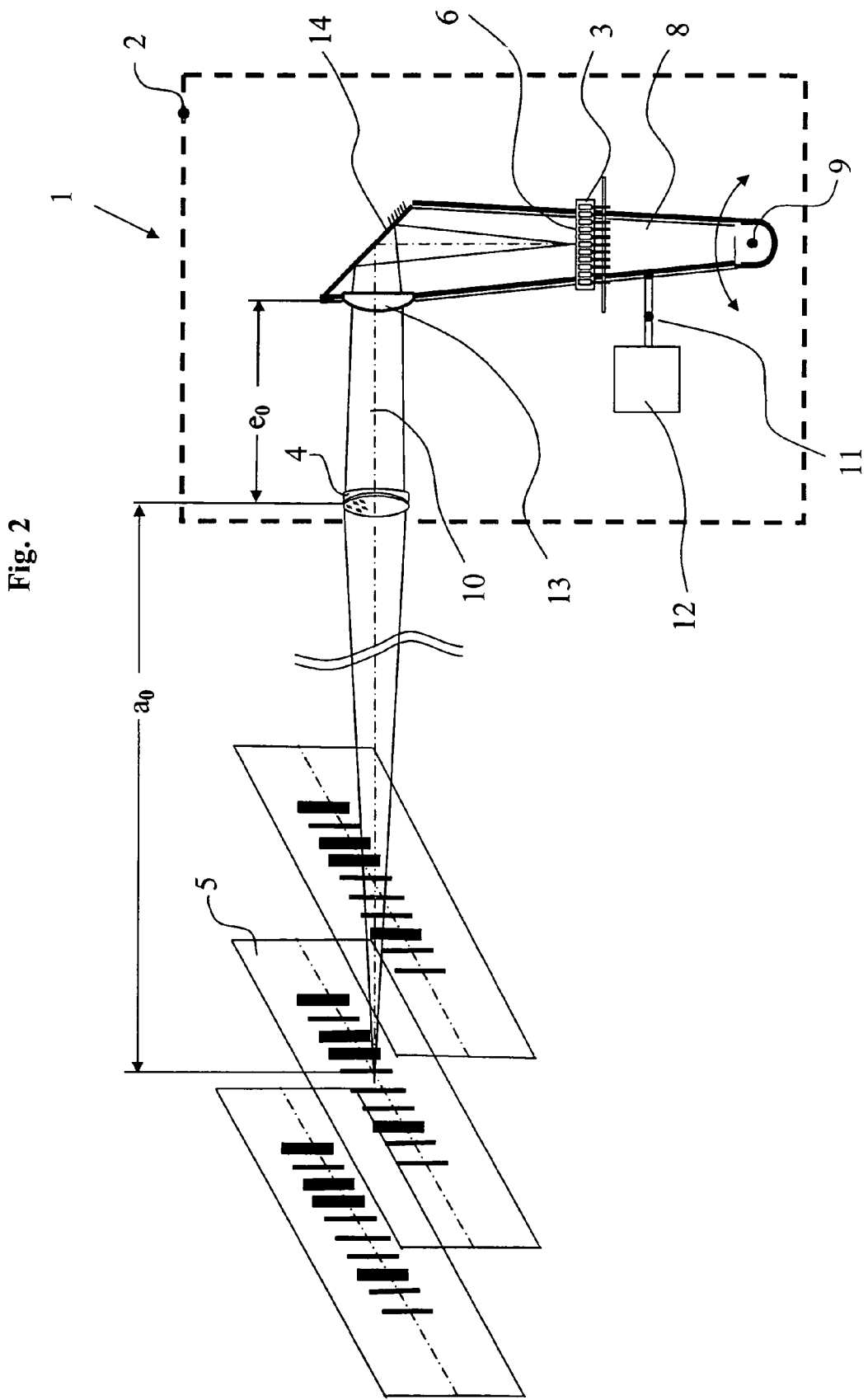
FIG. 2 shows the deflection optics in combination with an upstream convex lens and a downstream, inclined planar mirror.

Referring to FIG. 2, the illustrated deflection optic comprises a first lens 13 and a planar mirror 14 that is inclined by about 45° to the incoming light beam. Both the lens and the planar mirror are secured to the pivot arm. Planar mirror 14 deflects the incoming light beam by about 90° in the direction to light receiver 3. At the same time, lens 13 together with stationary optics 4 projects an image of object $5_0$ on light receiver 3. The focal length of the imaging optics is defined by the focal length of stationary optics 4, the focal length of lens 13, as well as the distance $e_0$ between the two optical components.

Figure 3:
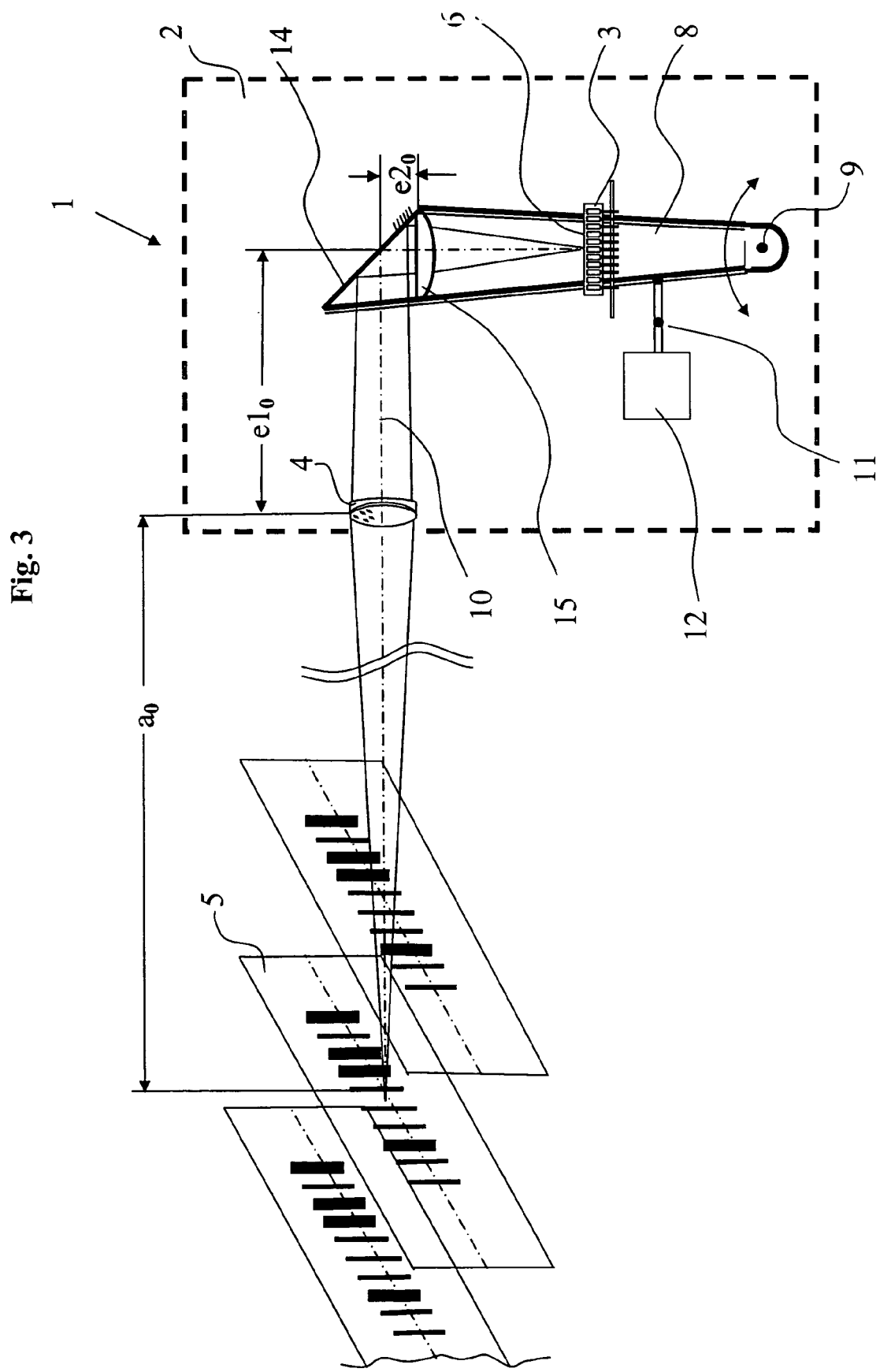
FIG. 3 shows the combination of an upstream, inclined planar mirror and a downstream convex lens.

Referring to FIG. 3, a lens 15 can be arranged between a planar mirror 14 and the light receiver 3. When pivot arm 8 is pivoted, distance $e1_0$, and therewith also the sum of the two individual distances $e1_0$ and $e2_0$, have a decisive influence on the optical length of the imaging optics.

Figure 4:
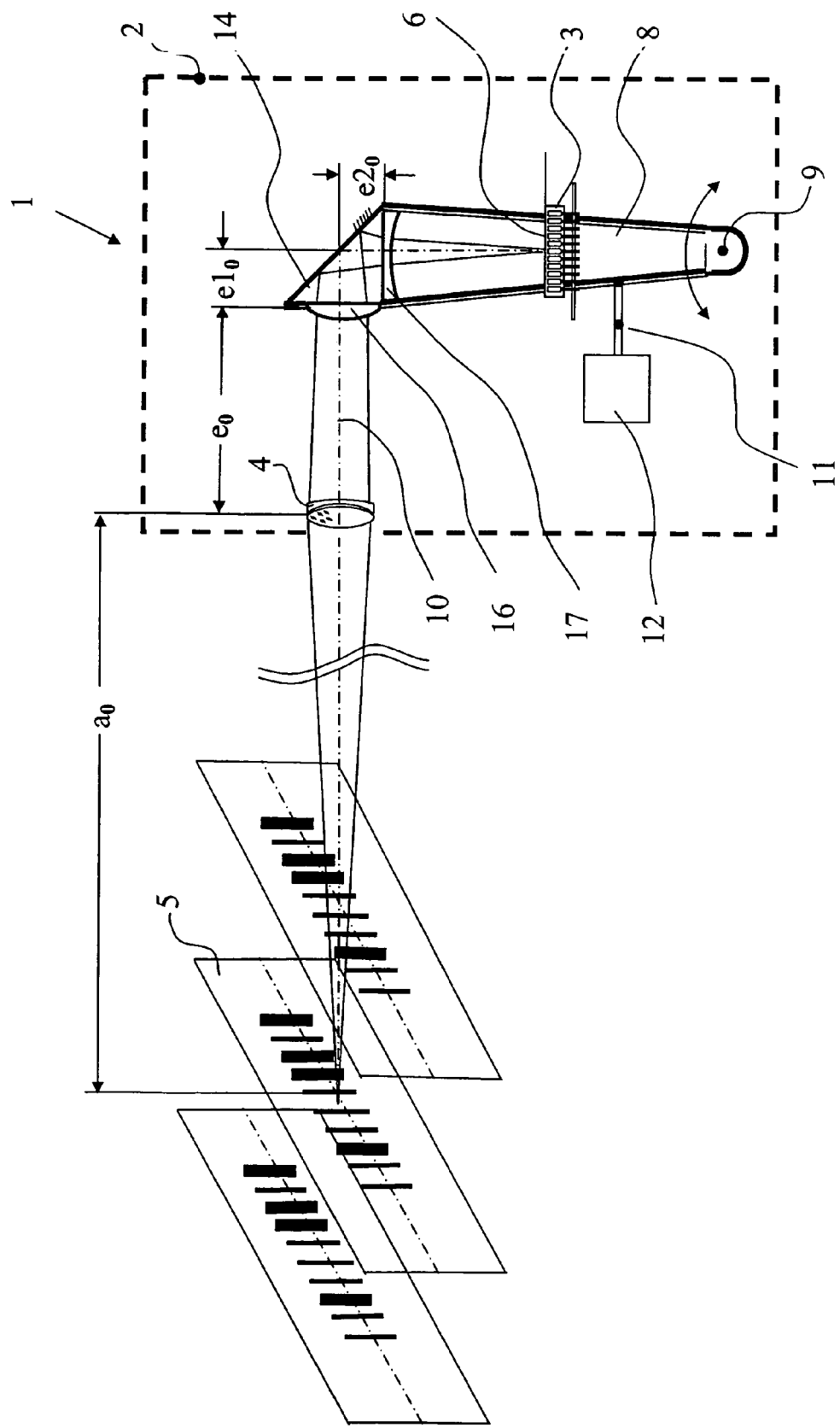
FIG. 4 shows the deflection optics in the form of a combination of an upstream convex lens, an inclined planar mirror, and then a concave lens.

FIG. 4 illustrates a preferred embodiment of the deflecting optics for enhancing the quality of the imaging optics. It involves stationary optics 4, a first lens 16, a planar mirror 14, and a second lens 17. In an alternative embodiment, not illustrated in the drawings, the stationary optics can be formed as two spatially spaced-apart components with the deflecting optics arranged between them. The components of the deflecting optics, that is, first lens 16, planar mirror 14, and second lens 17, are mounted on pivot arm 8 and, as a result, change their positions within housing 2. While the distances $e_1$ and $e_2$ of lens 16 to lens 17 do not change when pivot arm 8 is pivoted, the distance $e_0$ varies, which in turn results in a change in the focal length. Depending on the angular position of the pivot arm and the required quality of the imaging optics, imaging errors caused by the deflection optics must be corrected. These imaging errors are caused by the pivotal movements of the pivot arm, which result in the light beam striking the center of the lens no longer at a substantially right angle. Instead, depending on the angular position, the incoming light beam will strike the lenses at a more or less non-perpendicular angle and at the same time off-center.

The lens 13 shown in FIG. 2, lens 15 shown in FIG. 3, and lenses 16 and 17 shown in FIG. 4 can of course be constructed as a group of lenses, that is, of a plurality of lenses that can be optically connected with each other.

The arrangement illustrated in FIG. 4 using a first lens 16 in front of planar mirror 14 and a second lens 17 behind planar mirror 14 provides optical surfaces which can be employed to correct imaging errors. In a further embodiment, not illustrated in FIG. 4, planar mirror 14 between the first lens 16 and the second lens 17 can be constructed as a concave or a convex mirror to thereby provide additional optical surfaces that can be used for correcting imaging errors. Here too, it is contemplated that the lenses 16 and 17 be given a spherical, aspherical, toroidal or cylindrical form for reducing imaging errors. For certain applications, it can be advantageous to arrange either or both of the lenses off-axis.

Figure 5:
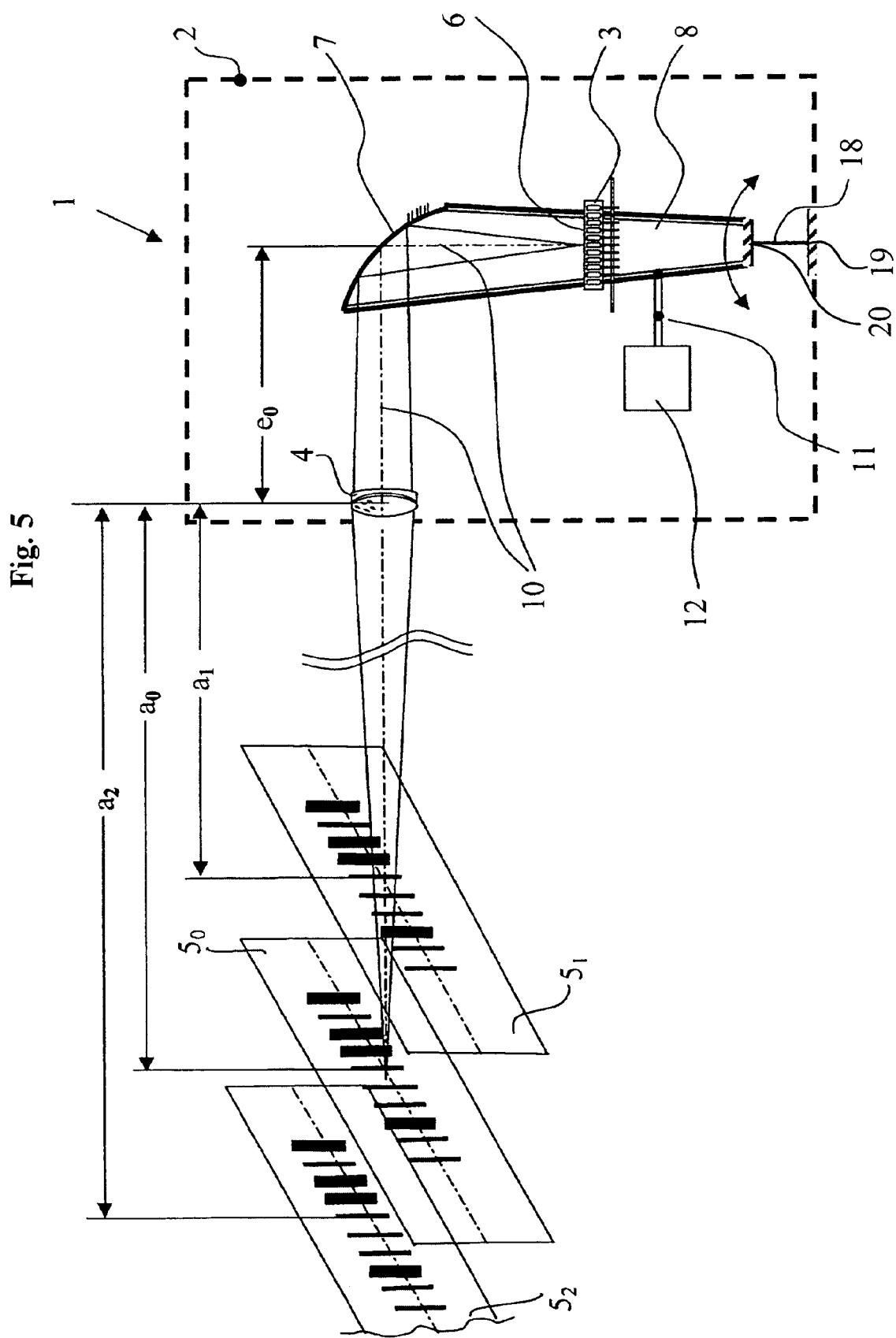
FIG. 5 shows the deflection optics of the present invention as in FIG. 1 and employing a flexible spring band defining a pivot axis for a pivot arm of the deflection optics.

FIG. 5 is a duplicate of FIG. 1 in all respects except that the embodiment of the invention illustrated in FIG. 5 uses a flat, flexible spring band 18 instead of pivot axis 9 shown in FIG. 1. A first end 19 of the spring band is suitably fixed to the housing and a second end 20 of the spring band is suitably fixed to the end of pivot arm 8 facing the housing. Since the pivot arm operates only over a limited rotational angle, in the embodiment shown in FIG. 5 the pivot point is defined by spring band 18 which forms a well-defined, play-free pivot bearing which can operate over long periods of time in a stable, wear-free manner.

What is claimed is:

1. Apparatus for reading one- or two-dimensional codes comprising a housing, a position resolving light receiver in the housing, an imaging optics having a plurality of components including at least one stationary optics and at least one deflecting optics arranged on an optical axis in front of the light receiver, a pivot arm pivotable about a pivot axis arranged in the housing, the deflecting optics being mounted on the pivot arm so that pivotal movements of the deflecting optics with the pivot arm cause a positional and angular change of an effective back focal distance, wherein the deflecting optics mounted on the pivot arm comprises an optical component which influences a focal length of the imaging optics and wherein, in addition to changes in the effective back focal distance, pivotal movements of the pivot arm change a focal length of the imaging optics.

2. Apparatus according to claim 1 wherein the deflecting optics comprises an inclined concave mirror.

3. Apparatus according to claim 1 wherein the deflecting optics comprises an inclined convex mirror.

4. Apparatus according to claim 2 wherein a reflecting surface of the concave mirror is one of spherical, aspherical, toroidal or cylindrical.

5. Apparatus according to claim 3 wherein a reflecting surface of the convex mirror is one of spherical, aspherical, toroidal or cylindrical.

6. Apparatus according to claim 1 wherein the deflecting optics comprises one of a concave mirror or a convex mirror, and wherein a surface configuration of the at least one of the concave mirror or the convex mirror is arranged off-axis.

7. Apparatus according to claim 1 wherein the deflecting optics comprises at least one mirror and at least one lens.

8. Apparatus according to claim 1 wherein the deflecting optics comprises a mirror, a first lens in front of the mirror, and a second lens behind the mirror.

9. Apparatus according to claim 7 wherein at least one of the first lens and the second lens is arranged off-axis for correcting image errors.

10. Apparatus according to claim 1 wherein the deflecting optics comprises at least one mirror and at least one of a convex lens or a concave lens.

11. Apparatus according to claim 1 wherein a first component of the deflecting optics comprises a spectral filter.

12. Apparatus according to claim 11 wherein the spectral filter is formed by a component of the deflecting optics.

13. Apparatus according to claim 1 wherein the deflecting optics comprises a lens having one of a spherical, aspherical, toroidal or cylindrical surface configuration.

14. Apparatus according to claim 1 wherein pivotal movements of the pivot arm do not substantially change a center of the image on the light receiver.

15. Apparatus according to claim 1 including an actuator which mechanically defines the magnitude of the movement of the pivot arm.

16. Apparatus according to claim 15 wherein the actuator comprises one of a linear or a rotary actuator.

17. Apparatus according to claim 1 including a flat, flexible spring band defining the pivot axis for the pivot arm and having first and second ends which are connected to components that pivot relative to each other.

18. Apparatus according to claim 1 wherein the stationary optics comprises first and second, spatially separated components.

19. Apparatus according to claim 18 wherein the deflecting optics is arranged between the components of the stationary optics.

20. Apparatus according to claim 1 wherein the deflecting optics includes a curved mirror.

* * * * *